(12) United States Patent
Kinkead

(10) Patent No.: US 7,033,045 B1
(45) Date of Patent: Apr. 25, 2006

(54) GRAVESITE MARKING DEVICE

(76) Inventor: Robin J Kinkead, 199 Belview Dr., Martinsburg, WV (US) 25401

( * ) Notice: Subject to any disclaimer, the term of this patent is extended or adjusted under 35 U.S.C. 154(b) by 0 days.

(21) Appl. No.: 11/163,542

(22) Filed: Oct. 21, 2005

(51) Int. Cl.
*F21V 33/00* (2006.01)
*F21S 6/00* (2006.01)
*A01G 5/00* (2006.01)

(52) U.S. Cl. .............. 362/253; 362/122; 362/183; 47/41.01

(58) Field of Classification Search ........... 362/253, 362/605, 617, 364, 122, 123, 412, 183, 553; 40/553

See application file for complete search history.

(56) References Cited

U.S. PATENT DOCUMENTS

| | | | |
|---|---|---|---|
| 4,304,076 A | 12/1981 | Splendora | |
| 5,255,170 A | 10/1993 | Plamp | |
| 5,564,816 A | 10/1996 | Arcadia | |
| D379,942 S | 6/1997 | Spicer | |
| D398,408 S | 9/1998 | Lin | |
| 6,038,812 A * | 3/2000 | Belokin et al. | ............ 47/41.01 |
| 6,132,054 A | 10/2000 | Rogers | |
| 6,170,193 B1 * | 1/2001 | Wright et al. | ................ 47/41.1 |
| 6,637,911 B1 | 10/2003 | Sittner | |

* cited by examiner

Primary Examiner—Renee Luebke
Assistant Examiner—Evan Dzierzynski
(74) Attorney, Agent, or Firm—Starkweather & Associates; Michael W. Starkweather; Richard M. Edge

(57) ABSTRACT

A gravesite marking device for providing illumination at a gravesite, comprising a vase; a receiver mounted inside the vase, which includes: a large aperture, large enough that a flower stem may be placed therethrough; and a coupling aperture; a side panel with at least three faces, which includes: an illumination device disposed on one of the at least two faces; a solar panel disposed on one of the at least two faces, and directed to collect solar power; and a securing device mounted on one of the at least three faces, and coupled to the coupling aperture of the receiver.

11 Claims, 3 Drawing Sheets

GRAVESITE MARKING DEVICE

BACKGROUND OF THE INVENTION

The present invention relates to gravesite marking devices, specifically gravesite marking devices for providing illumination.

DESCRIPTION OF THE RELATED ART

In U.S. Pat. No. 5,255,170, Plamp discloses a memorial comprising a three dimensional monument member having a configuration and first surface conforming to said configuration, an illuminating means, coupled to a first surface of said monument member, for illuminating said monument, said illuminating means including a plurality of light sources arranged on said first surface to substantially conform to said configuration. The memorial further includes power means, electrically coupled to said illumination means, for providing said electrical power, and control means, electrically coupled to said illumination means and said power means, for responsively coupling said electrical power to said illuminating means and wherein said plurality of light sources, when illuminated, radiate outward appearing as illuminating star-like light sources.

Arcadia discloses in U.S. Pat. No. 5,564,816 an illuminated memorial for use at a grave site comprised of an opaque hollow structure that defines an interior chamber. An aperture extends into said hollow structure exposing a portion of the hollow chamber. The hollow structure itself is preferably formed from metal and is shaped and reinforced in its structure to resist physical damage from vandals. A light source is contained within hollow structure proximate the aperture, whereby light emitted by said light source is directed through said aperture. The light source is powered by at least one rechargeable battery. A photovoltaic source is supported at the highest point of the hollow structure, wherein said photovoltaic source converts light into electricity and recharges the rechargeable batteries during daylight conditions.

Rogers discloses in U.S. Pat. No. 6,132,054 a memorial light assembly for providing a pair of light sources configured to resemble a pair of candles for mounting to the top of a headstone. The memorial light assembly includes a base adapted for mounting on a headstone. A pair of candle assemblies are upwardly extended from the base. Each of the candle assemblies has a light source with an outer configuration designed to simulate a flame of a candle. A power source assembly is mounted to the base and is electrically connected to the light sources.

In U.S. Pat. No. 4,304,076 Splendora discloses a headstone, grave marker or the like, comprising a substantially transparent member, having means for maintaining the member in upstanding position, and means depicting information pertinent to a decedent displayed on said member. The information may be inscribed on the surface of the member, or the information may be embedded within the member, being nevertheless visible. The information depicting means may comprise members having written information, or merely three dimensional objects indicative of the significant aspects of the decedent's life. The monument is preferably molded from plastic material, and the sides of the member may be disposed at such angles with respect to one another that the information is reflected in at least one of the sides.

Sittner discloses in U.S. Pat. No. 6,637,911 a grave marker and lighting apparatus and method of use having an interchangeable illuminated form which may take the form of a lighted candle, a lighted Christmas tree, a lighted floral arrangement, a lighted flag, or any other illuminated form to commemorate an occasion or season. The apparatus having a photovoltaic cell to charge internal batteries and a photoconductive cell to signal electronic circuitry to turn on the illuminated form during nighttime hours. The apparatus further includes a unique plate extension mounting portion for attachment to a tombstone and base extending anchors for ground securing.

There are also several design patents, such as U.S. Pat. D 379,942 to Spicer which discloses the ornamental design for a memorial light, and U.S. Pat. D 398,408 which discloses the ornamental design for a cross light.

What is needed is a gravesite marking device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available gravesite marking devices. Accordingly, the present invention has been developed to provide a gravesite marking device for providing illumination at a gravesite, comprising a vase a receiver mounted inside the vase, which includes a large aperture, large enough that a flower stem may be placed therethrough; and a coupling aperture; a side panel with at least three faces, which includes: an illumination device disposed on one of the at least two faces; a solar panel disposed on one of the at least two faces, and directed to collect solar power; and a securing device mounted on one of the at least three faces, and coupled to the coupling aperture of the receiver.

The vase may be circular when viewed from above, and the receiver comprises substantially circular when viewed from above. The vase may further comprises at least two openings, and the receiver may further comprise at least two corresponding coupling pins that fit into the at least two openings. The at least two openings may be threaded opposite of each other, and the coupling pins may be threaded to correspond to the at least two openings. The coupling pins may be spring mounted. The side panel may further include a power storage device. The power storage device may be rechargeable, and the solar panel may provide power to the power storage device when sufficient light is available. The gravesite marking device may further include a switch to manually turn the illumination device on or off. The gravesite marking device may further include a switch that automatically turns on the illumination device when insufficient light is available to the solar panel to provide power to the power storage device. The gravesite illumination device of may further include a switch that turns on the illumination device at certain times of day.

According to another embodiment, the present invention includes a gravesite marking device for providing illumination at a gravesite, which consists only of a vase, a receiver mounted inside the vase, which includes a large aperture, large enough that a flower stem may be placed therethrough and a coupling aperture, a side panel with at least three faces, which includes an illumination device disposed on one of the at least two faces, a solar panel disposed on one of the at least two faces, and directed to collect solar power; and a securing device mounted on one of the at least three faces, and coupled to the coupling aperture of the receiver.

The vase may be substantially circular when viewed from above, and the receiver may be substantially circular when viewed from above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
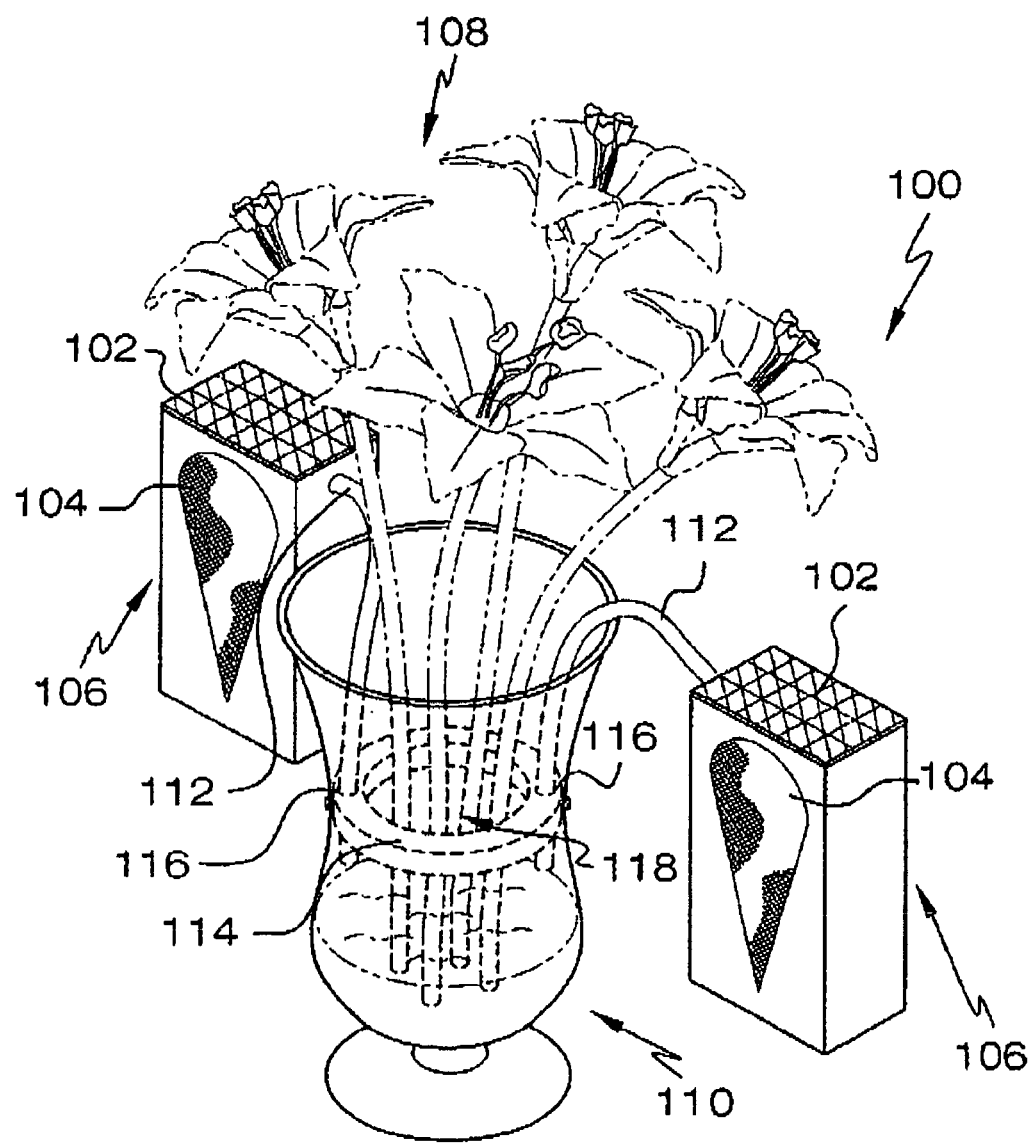
FIG. 1 illustrates a perspective view of the gravesite marking device according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

FIG. 1 illustrates a perspective view of the gravesite marking device according to one embodiment of the present invention. The gravesite marking device 100 may include a vase 110 and a side panel 106. The vase 110 may be any that is known in the art of gravesite marking. Preferably, the vase 110 is capable of having flowers placed therein. In the vase 110 may be mounted a receiver 114. According to one embodiment, the vase 110 and the mounting device 114 are the same basic shape. The vase 110 and the mounting device 114 may both be circular when viewed from above. The mounting device 114 may include a large aperture 118 through which flowers 108 or other decorations may be placed.

Figure 3:
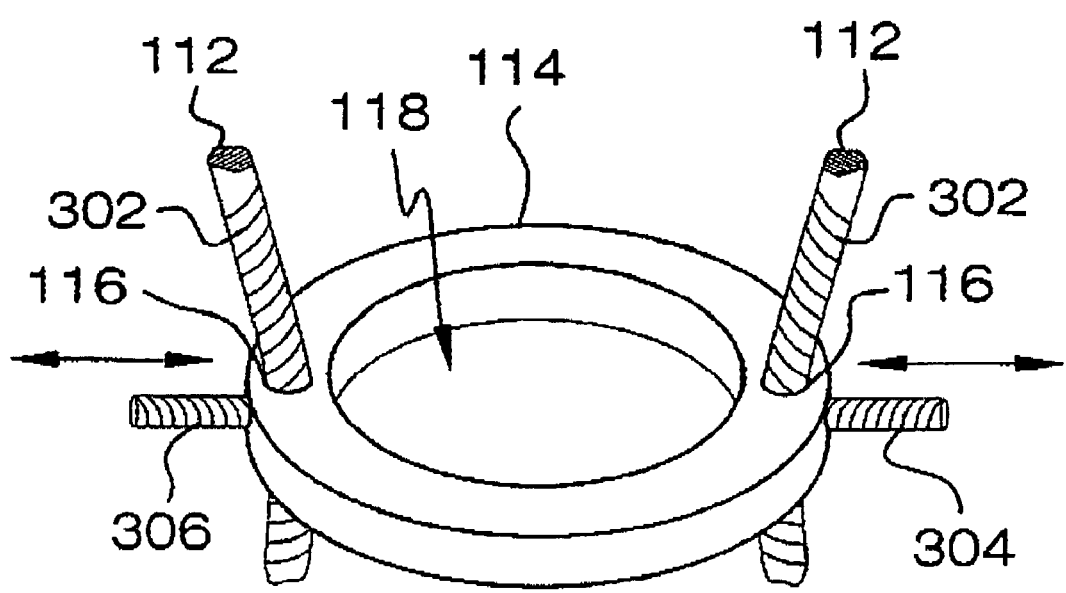
FIG. 3 illustrates a perspective view of a receiver according to one embodiment of the present invention.

The mounting device 114 may also include a coupling aperture 116. The coupling aperture 116 may be configured to receive and couple to a side panel securing device 112. Turning briefly to FIG. 3, it can be seen that according to one embodiment, the coupling aperture 116 may be threaded, and the side panel securing device 112 may be correspondingly threaded 302 such that the side panel securing device 112 may be threaded into the coupling aperture 116, thus securing the side panel securing device 112 to the receiver 114.

The side panel securing device 112 may also be secured to the side panel 106. The side panel may include at least three faces. On one of the faces may be a solar panel 102 for collecting light and transforming the light into electrical power. On another face may be mounted an illumination device 104 for providing illumination. On yet another face may be a junction between the side panel 106 and the side panel securing device 1112. Preferably the solar panel 102 is mounted on a face where the most sunlight is available. According to one embodiment, the solar panel 102 is mounted on the topmost and upwardly facing face.

The illumination device 104 may be in any shape desired. The illumination device 104 may be etched panels. For example, the illumination device may be in the shape of praying hands, a beacon, male or female symbols, a rose, a butterfly, a bear, a military theme, or so forth. The illumination device 104 may include any means for illumination known in the art. Some non-limiting examples of means for illumination include: light emitting diodes, incandescent lighting, fluorescent lighting, phosphorescent lighting, and so forth.

Figure 2:
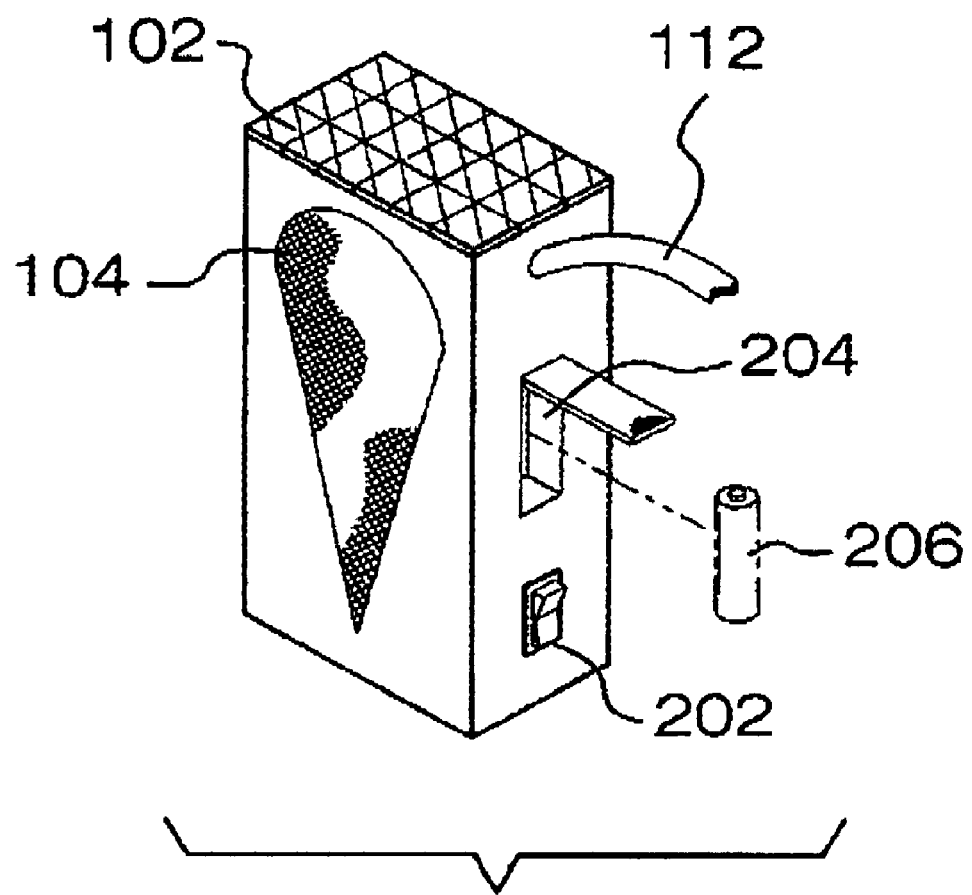
FIG. 2 illustrates; a perspective view of a side panel of a gravesite marking device according to one embodiment of the present invention.

Turning to FIG. 2, what is illustrated is a side panel 106 according to one embodiment of the present invention. The side panel may include a switch 202. The switch 202 may be a manual switch for manually turning the illumination device 104 on or off. The switch 202 may be an automatic switch for turning the illumination device on or off in response to certain conditions. Some non-limiting examples of the conditions may include the amount of light available to the solar panel, the time of day, and so forth.

The side panel 106 may include a second power source 206. The second power source may be placed inside of the side panel 106. The side panel 106 may include a port 204 through which the second power source 206 may be place. The second power source 206 may be a battery. The second power source 206 may be a rechargeable battery. The side panel 106 may be configured such that the solar panel provides electricity to recharge the rechargeable battery. The side panel 106 may include a switch such that when the solar panel 102 provides sufficient electricity to recharge the rechargeable battery, the illumination device 104 remains off, but when the solar panel 102 does not provide sufficient electricity to recharge the rechargeable battery, the illumination device 104 turns on, and runs off of the power provided by the rechargeable battery. In this configuration, the illumination device 104 will remain off during the day when the solar panel 102 recharges the battery, and will turn on at night when the solar panel 102 is not recharging the battery.

Turning now to FIG. 3, illustrated is the receiver 114 according to one embodiment of the present invention. According to this embodiment, the side panel coupling devices 112 are threaded, and the coupling apertures 116 of the receiver 114 are correspondingly threaded. The receiver 114 also may include right 304 and left 306 coupling pins. The coupling pins 304, 306 may correspond to openings in the vase. The coupling pins 304, 306 may be spring mounted such that they may spring into corresponding openings in the vase. The coupling pins 304, 306 may be threaded and the vase may have corresponding threaded openings. The threading on the coupling pins 304, 306 may be opposite of each other (that is one has left-handed threads and the other has right-handed threads) such that when the pins are placed near the threaded openings in the vase, the receiver needs only to be rotated in one direction to screw the both of the coupling pins 305, 306 into the threaded openings of the vase. Further, the coupling pins 304, 306 may be moveable in the direction of the arrows but not rotatable such that when the receiver 114 is rotated and the coupling pins 304, 306 are screwed into the threaded openings, the coupling pins 304, 306 are pulled to extend further into the threaded openings. The receiver 114 may also include a large aperture 118 through which the stems of flowers 108 may be placed.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A gravesite marking device for providing illumination at a gravesite, comprising:
   a vase;
   a receiver mounted inside the vase, which includes:
     a large aperture, large enough that a flower stem may be placed therethrough; and
     a coupling aperture;
   a side panel with at least three faces, which includes:
     an illumination device disposed on one of the at least three faces;
     a solar panel disposed on one of the at least three faces, and directed to collect solar power; and a securing device mounted on one of the at least three faces, and coupled to the coupling aperture of the receiver.

2. The gravesite marking device of claim 1, wherein the vase is substantially circular when viewed from above, and the receiver is substantially circular when viewed from above.

3. The gravesite marking device of claim 2, wherein the vase further comprises at least two openings, and the receiver further comprises at least two corresponding coupling pins that fit into the at least two openings.

4. The gravesite marking device of claim 3, wherein the at least two openings are threaded opposite of each other, and the coupling pins are threaded to correspond to the at least two openings.

5. The gravesite marking device of claim 1, wherein the side panel further comprises a power storage device.

6. The gravesite marking device of claim 5, wherein the power storage device is rechargeable, and the solar panel provides power to the power storage device when sufficient light is available.

7. The gravesite marking device of claim 6, further comprising a switch that automatically turns on the illumination device when insufficient light is available to the solar panel to provide power to the power storage device.

8. The gravesite marking device of claim 1, further comprising a switch to manually turn the illumination device on or off.

9. The gravesite illumination device of claim 1, further comprising a switch that turns on the illumination device at certain times of day.

10. A gravesite marking device for providing illumination at a gravesite, consisting of:
   a vase;
   a receiver mounted inside the vase, which includes:
      a large aperture, large enough that a flower stem may be placed therethrough; and
      a coupling aperture;
   a side panel with at least three faces, which includes:
      an illumination device disposed on one of the at least three faces;
      a solar panel disposed on one of the at least three faces, and directed to collect solar power; and
   a securing device mounted on one of the at least three faces, and coupled to the coupling aperture of the receiver.

11. The gravesite marking device of claim 10, wherein the vase is substantially circular when viewed from above, and the receiver comprises substantially circular when viewed from above.

* * * * *